United States Patent [19]
Lovingham

[11] 3,962,862
[45] June 15, 1976

[54] EXPLOSION ENERGY ABSORBER FOR ROCKET MOTOR INJECTORS

[75] Inventor: Joseph J. Lovingham, Madison, N.J.

[73] Assignee: Thiokol Corporation, Newtown, Pa.

[22] Filed: May 21, 1968

[21] Appl. No.: 730,744

[52] U.S. Cl.................. 60/39.09 R; 60/39.74 A; 138/30
[51] Int. Cl.² .............................................. F02K 9/02
[58] Field of Search........... 60/39.74 A, 258, 39.09; 138/31, 30

[56] References Cited
UNITED STATES PATENTS

| | | | |
|---|---|---|---|
| 2,926,883 | 3/1960 | Prybylski | 60/39.74 |
| 2,933,888 | 4/1960 | Africano | 60/258 |
| 3,170,286 | 2/1965 | Stein | 60/258 |
| 3,431,732 | 3/1969 | Lovingham | 60/258 |

FOREIGN PATENTS OR APPLICATIONS

| 1,143,032 | 4/1957 | France | 138/30 |
|---|---|---|---|

*Primary Examiner*—Douglas Hart
*Attorney, Agent, or Firm*—Stanley A. Marcus; William R. Wright, Jr.

[57] ABSTRACT

A device is disclosed for cushioning the damaging effect of the energy released in ZOT explosions within the oxidizer injector of a rocket motor. A sliding piston is cushioned by a viscoelastic material included directly within the oxidizer injector.

1 Claim, 4 Drawing Figures

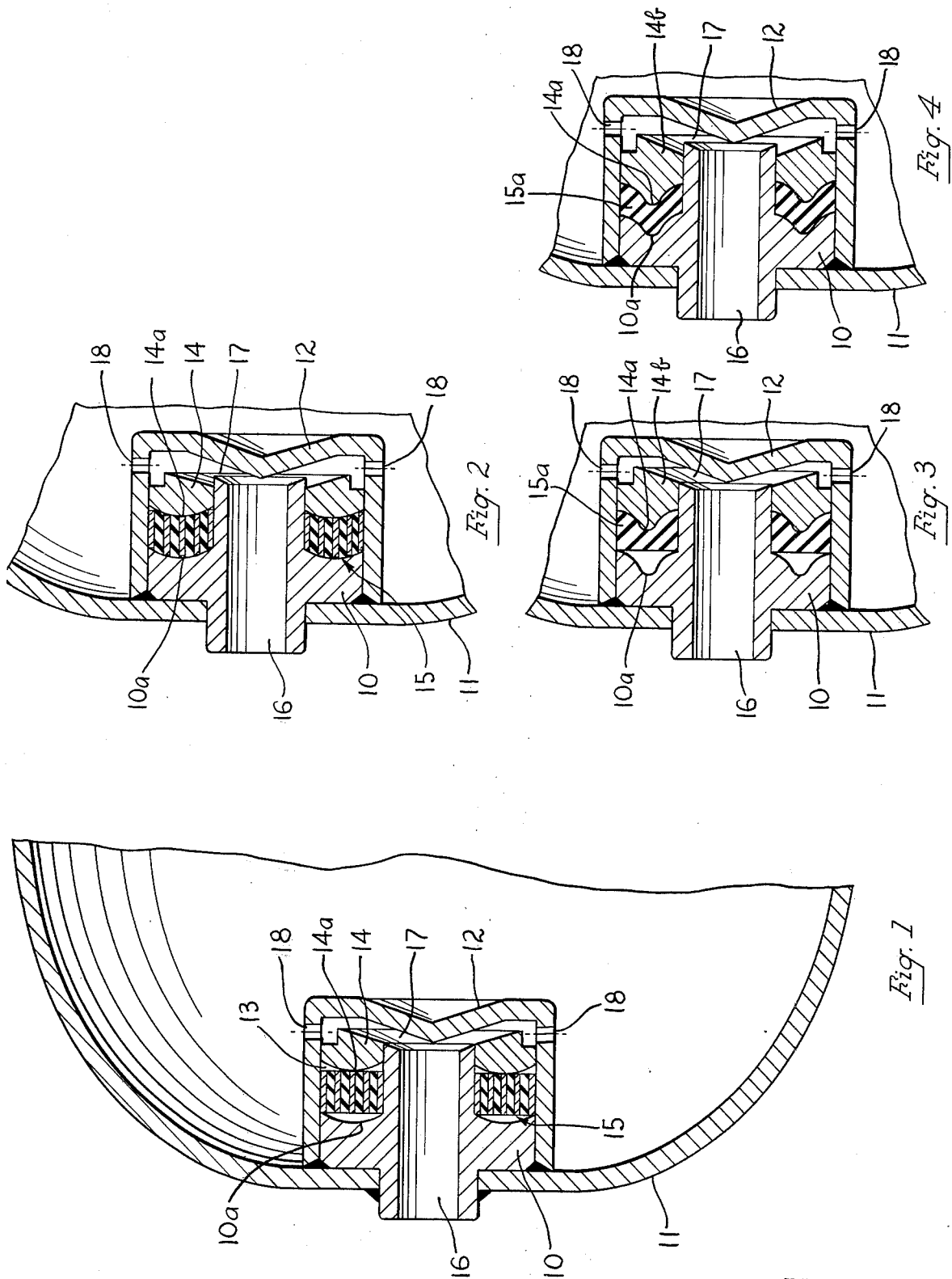

EXPLOSION ENERGY ABSORBER FOR ROCKET MOTOR INJECTORS

The present invention relates to rocket motors and more specifically, relates to a device for absorbing some of the energy released by explosions which sometimes occur inside the oxidizer injector of a rocket motor and are known as ZOT explosions. The exact cause of the ZOT explosion is not known but it is hypothesized that fuel or fuel-type products enter the oxidizer injector at some time prior to the start of a firing cycle. As the incoming oxidizer reaches these products a reaction occurs sometimes at a very high level. This is particularly likely to occur in rocket motors which must start and restart in a pulse mode duty cycle at high altitude or space conditions and can be catastrophic under those conditions. The present invention is intended to reduce the effect of these explosions on the injector and its immediate surrounding structure and thus the structural requirements can be reduced with a consequent saving in weight and with improved reliability of the motor.

It is, therefore, an object of the present invention to provide an improved rocket motor oxidizer injector which includes a device for reducing the damaging effects of ZOT explosions within the injector itself and thus lessens the necessary weight of the injector structure and its surrounding structure while improving the overall reliability of the rocket motor.

Other objects and advantages of the present invention will be apparent from the description and claims which follow:

In the drawings:

FIG. 1 is a cross-sectional view of an individual oxidizer injector showing the energy absorber in its normal motor running condition;

FIG. 2 is a view similar to FIG. 1 showing the energy absorber in its actuated position as a ZOT explosion occurs;

FIG. 3 is a cross-sectional view of an injector showing another arrangement of the energy absorber and during its normal motor running condition;

FIG. 4 is a view similar to FIG. 3 showing the energy absorber in its actuated position as ZOT explosion occurs.

In FIG. 1 is shown an embodiment of the present invention in which housing 10 is attached in place in rocket motor combustion chamber 11 and has an outer housing 12 fitted about it in the manner shown, the whole being cylindrical in form. As will be seen in FIG. 1, an annular chamber 13 is defined by the wall of housing 10 and outer housing 12 and freely slidable therein is annular piston or ring 14 which has a contoured face 14a of substantially the same contour as face 10a of housing 10. Interposed between these two faces is a cushioning ring 15 comprised of alternate rings of metal and viscoelastic material such as silicone rubber, a nitroso rubber such as an epoxy cured carboxy terminated terpolymer, or any other similar viscoelastic material which is compatible with the oxidizer used in the rocket motor. Also, the viscoelastic material must have a Durometer rating of approximately number 40 and a minimum elongation of approximately 450 percent. This material is bonded to the metal rings in sandwich fashion to produce ring 15 which is capable of elastic deformation by absorption of the shear force between the metal layers or rings and the rubber layers as force is applied from the side. With this arrangement, lateral distortion of the viscoelastic material is minimized and the movement becomes essentially confined to that direction which is axial of the rings. This makes it possible to design a very accurately programmed distortion of the ring 15 including variations in the relative thicknesses, number and material of the bonded layers all of which should improve the overall performance of the energy absorber through this more exacting engineering. Also, the ring 15 can be more easily designed to be more or less rigid as desired to take into account any normal pressure fluctuations which may differ with various rocket motors for different applications.

Through the center of housing 10 is an inlet passage 16 which communicates with annular passage 17 which in turn is in communication with oxidizer outlet ports 18. Also, it will be seen that ring 14 has its outer face (right hand side in the drawings) exposed to annular passage 17 and thus to the oxidizer passing through it.

In operation, pressurized oxidizer fluid enters the injector through inlet passage 16 and flows into and through passage 17 from which it flows out into the rocket motor combustion chamber 11 where combustion takes place with fuel that has been injected from other means (not shown). The pressure of the oxidizer fluid will hold ring 14 in place as shown in FIG. 1 but will not be great enough to deform cushioning ring 15 to any appreciable extent during normal flow conditions as the motor operates, shuts down or restarts. If, however, a ZOT explosion should occur in the injector in passages 16, 17 due to the pressure of some fuel in these passages, a very high pressure will suddenly develop urging ring 14 against cushioning ring 15 with great force and causing it to deform as the rubber is stretched in a horizontal shearing action. The extent of the deformation will be dependent upon the force of the explosion but it can deform to assume the temporary shape shown in FIG. 2 in which the mating contours of faces 10a and 14a will be followed except for the steps introduced by the thickness of the metal layers. The major portion of energy of the ZOT explosion will thus be absorbed by this action and no damage to the structure will occur. Upon a return to normal flow pressures, ring 15 will again assume its normal straight-sided shape.

Another arrangement of the present invention is shown in FIGS. 3 and 4 in which the contours of ring 14b and its counterpart face 10a are shaped in accordance with a predetermined curve so that the deformation of cushioning ring 15a will take place at a predetermined and programmed rate, if desired, as might be the case if other unusual but normal pressure increases are anticipated in operation of the motor. In this arrangement, the piston 14b is bonded to the viscoelastic material and the ring 15a is in this instance made up of viscoelastic material only so that it will follow the contoured surface completely other than in steps as would be the case with the metal-rubber layered ring of FIG. 1.

It is to be understood that the various forms of my invention herewith shown and described are to be taken as preferred examples of the same and that various changes in the shape, size and arrangement of parts may be resorted to without departure from the spirit of the invention or the scope of the subjoined claims.

What is claimed is:

1. In a rocket motor oxidizer injector having a housing and a passage for pressurized oxidizer through said housing, the improvement comprising a free piston slidable in said housing and exposed to the oxidizer passage, a viscoelastic material interposed between the piston and the housing with the piston face adjacent to the viscoelastic material shaped to a predetermined contour and its counterpart face on the housing being of substantially the same contour and with the viscoelastic material bonded between concentric metal rings in alternate layers with the rings substantially parallel to the central axis of the piston.

* * * * *